Aug. 31, 1943.　　D. E. GROVE ET AL　　2,328,526
JUICE EXTRACTOR
Filed April 1, 1941　　2 Sheets-Sheet 1
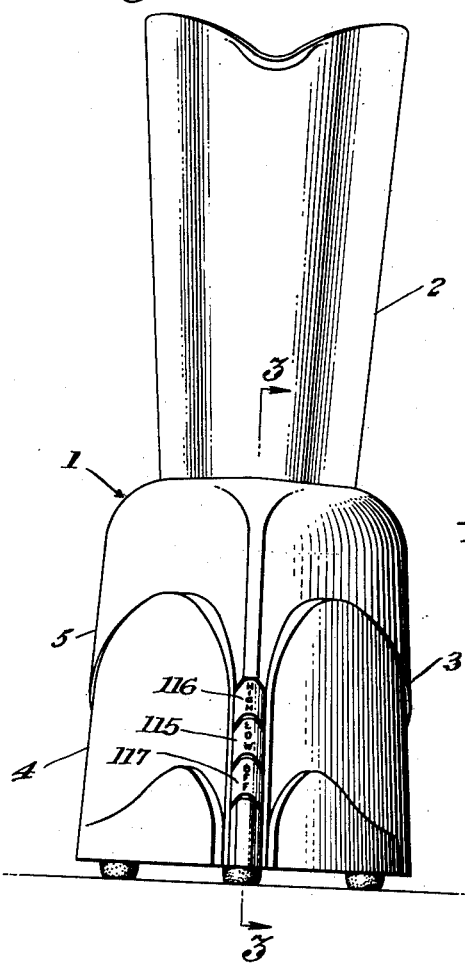
Fig. 1
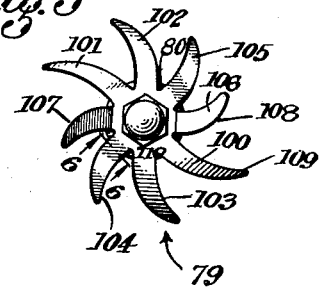
Fig. 5
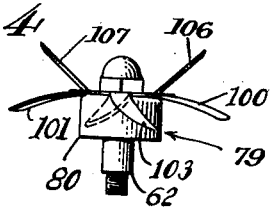
Fig. 4
Fig. 6
Fig. 9
Fig. 7　　Fig. 8
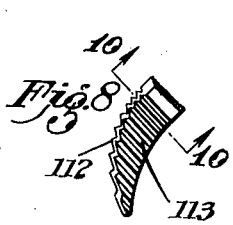
Fig. 10
Don E. Grove & Jackson D. Comstock, INVENTORS
BY
ATTORNEY Aug. 31, 1943.　　D. E. GROVE ET AL　　2,328,526
JUICE EXTRACTOR
Filed April 1, 1941　　2 Sheets-Sheet 2

INVENTORS,
Don E. Grove & Jackson D. Comstock;
BY
ATTORNEY

Patented Aug. 31, 1943

2,328,526

UNITED STATES PATENT OFFICE 2,328,526

JUICE EXTRACTOR

Don E. Grove, West Los Angeles, and Jackson D. Comstock, Los Angeles, Calif., assignors to Hollywood Liquefier Corporation, Los Angeles, Calif., a corporation of California Application April 1, 1941, Serial No. 386,238

4 Claims. (Cl. 146—124)

This invention relates to juice extractors. The term "juice extractor" as used herein applies to an instrumentality adapted to form into an impalpable mass fruits, vegetables, and the like, the juice of which is to be extracted therefrom for drinking purposes.

At the present time, numerous stands sell various fruit and vegetable juices.

An object of the present invention is to provide a juice extractor which the consumer may utilize for the purpose of extracting juice from vegetables and fruits rapidly and economically, and without destroying the vitamin content thereof.

It has been found that vegetable juices, when allowed to stand, tend to oxidize, and otherwise lose valuable properties. Vegetable juices should be consumed immediately after the extraction of the juice. The present juice extractor is adapted for home use, to the end that a supply of fresh vegetables or fruits may be kept in stock and used when, as and if desired, for the purpose of extracting juice therefrom. In this manner, the juices will at all times be fresh, not subject to deterioration from long standing, and with more beneficial and healthful results to the consumer.

While the present device is adapted for home use, yet it readily lends itself to use at commercial fruit and vegetable stands where vegetable juices may be extracted from the vegetables or fruits for the customer. The device may be easily cleaned, has its parts so arranged that liability of injury to the operator is minimized, a device which is attractive in appearance, inexpensive in cost of manufacture and efficient in operation.

With the above mentioned and other objects in view, the invention consists in the novel and useful provision, formation, construction, association, and relative arrangement of parts, members and features, all as shown in certain embodiments in the accompanying drawings, described generally, and more particularly pointed out in the claims.

In the drawings:

Figure 1 is a front elevation of the improved juice extractor as an entirety,

Figure 3:
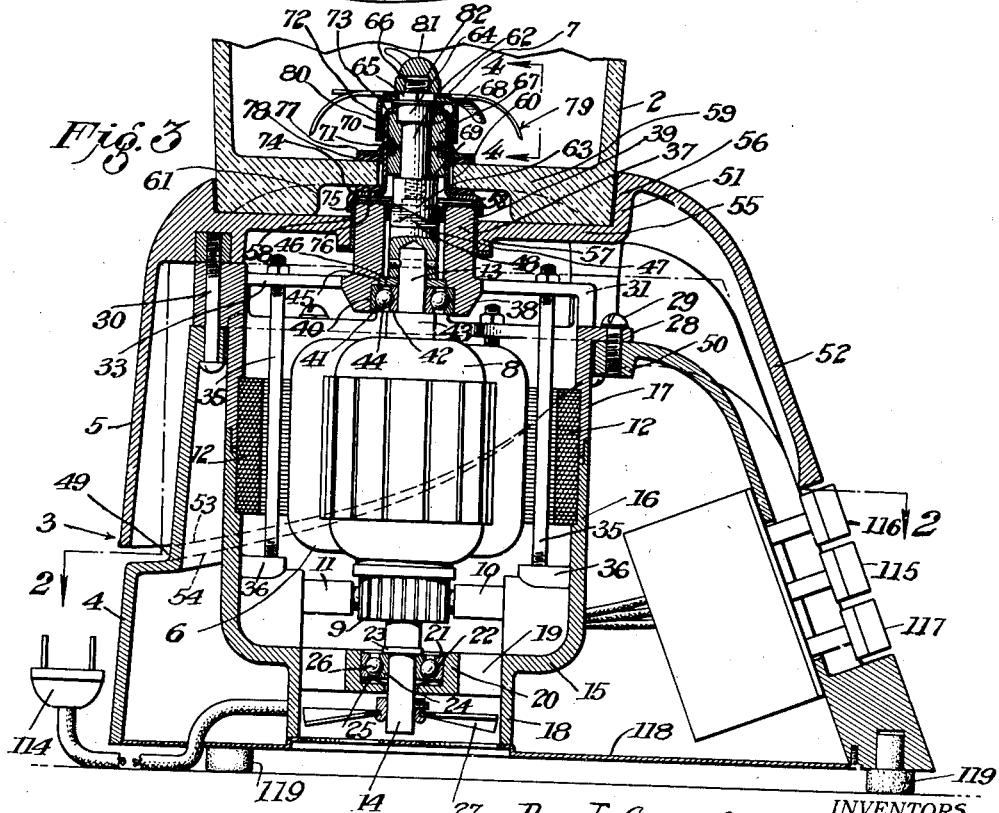

Figure 3 is a sectional view on the line 3—3 of Figure 1, and on an enlarged scale from said figure, Figure 4 is a side elevation of one form of cutter which may be utilized in the practice of the invention, Figure 5 is a plan view of the cutter shown in Figure 4, Figure 6 is a sectional view on the line 6—6 of Figure 5, Figure 7 is a fragmentary perspective view of one form of cutter blade, Figure 8 is a fragmentary perspective view of a modified form of cutter blade, Figure 9 is a sectional view on the line 9—9 of Figure 7, and, Figure 10 is a sectional view on the line 10—10 of Figure 8.

Referring now to the drawings, the improved juice extractor is designated as an entirety and in one embodiment by numeral 1, wherein 2 is a container adapted to hold the fruit or vegetable juices, and 3 a casing adapted to house a motive unit for driving a cutter.

The casing is streamlined in form to add to its ornamental appearance. We may, however, provide any type of surface configuration for the casing. Specifically, the casing 3 is in two parts, as shown at 4 and 5, and the two casing parts are adapted to house a motor designated generally as 6, which drives the cutter 7.

Figure 2:
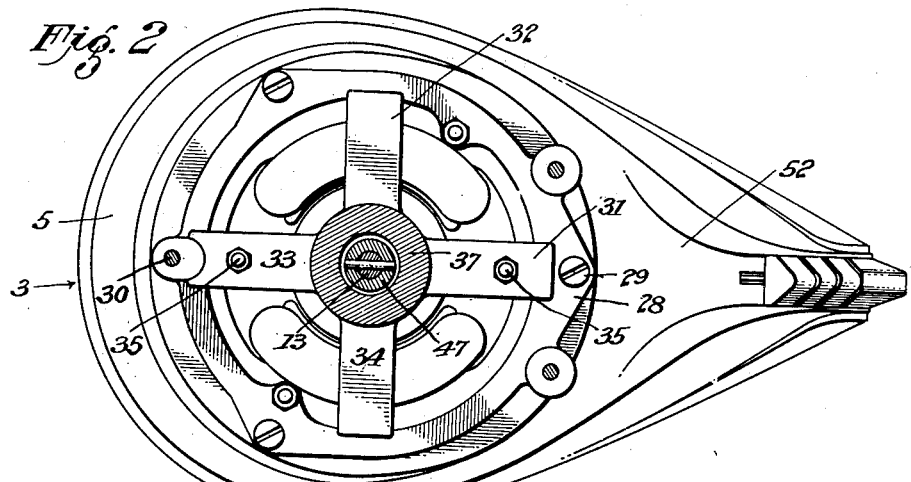
Figure 2 is a sectional view on the line 2—2 of Figure 3.

The motor 6 is of the conventional type and may have two speeds, such as "low" and "high," said motor including an armature 8, commutator 9, brushes 10 and 11 in engagement with the commutator, and the usual field coils 12. The motor shaft extends beyond both ends of the armature, as shown at 13 and 14. A casting 15 is adapted to surround the motor, as shown. This casting may be in two parts, as shown at 16 and 17, best adapted to carry the field coils. The lower end of the casting is formed with an annular flange 18 and with a web 19, the web centrally provided with an annular member 20. This member 20 carries a ring 21, formed with an annular race 22. The shaft end 14 is shouldered at 23, and bearing against said shoulder and surrounding the said shaft end is an annulus 24 provided with a race 25. Ball bearings 26 are received within the race portions of the two rings or annular members 22 and 24. Thus, the motor, armature and commutator are supported at one end. This motor is adapted to have its shaft maintained in a vertical position relative to some support. The shaft end 14 carries a fan or propeller 27. This propeller is adapted to deliver a blast of air past the web 19, upwardly around the motor and outwardly between the two casing parts 4 and 5, for the purpose of cooling the motor when it is running. The casting 17 is provided with one or more perforated ears 28, which may vary as to thickness, the said ears permitting the casting to be secured to the casing part 4, as illustrated at 29, and in certain instances, to both casing parts, as shown at 30. Secured to the casting part 17 are four equally spaced arms arranged in diametric pairs, as shown at 31, 32, 33, and 34 in Figure 2. Elongated bolts, designated generally as 35, extend between the aforesaid arms and projections 36 carried by the casing part 16, whereby when suitable nuts are secured to said bolts, the two casing parts 16 and 17 may be held in working relationship, as shown in Figure 3.

An annulus 37 is centrally carried by the arms 31 to 34, inclusive, the said annulus extending on both sides of the said arms as, for instance, shown at 38 and 39. The portion at 38 is counter-bored at 40 to receive a ring 41, provided with a race. A second ring 42 provided with a race, bears against an enlargement 43 surrounding the shaft end 13 of the motor. Included between the race members are bearings 44. Annulus 37 is counter-bored at 45, to accommodate washer 46, which surrounds the shaft end 13 and rests against one or both of said race members 40 and 42. Pinned to the shaft end 13 is a stud shaft 47. This stud shaft is confined within the annulus 37 and carries at its upper end a diametric piece 48.

The casing part 4 includes a side wall which may be of streamlined form, and provided with a vanishing or crescent shaped offset portion 49, as illustrated in the figures. The casing is open at the bottom and the top wall is flanged at 50 to receive machine screws for anchoring the motor and its casting. The part 5 of the casing jackets or overlies the casing 4. This casing includes a top portion 51 and a skirt 52. The spacing between the skirt and the casing 4 varies, due to the offset portion 49; this variation is indicated by the dotted lines 53 and 54. The spacing is such as to permit air directed upwardly past the motor by the fan 27 to escape from between the two casings at the zone indicated by these dotted lines. The top 51 is provided with an annular supporting piece 55 for the base of the container 2 and a side wall 56, the top of which merges with the skirt 52. The supporting piece 55 is flanged at 57. A substantially Z-shaped annulus 58 is adapted to overlie and in part surround the annulus 37 and engage beneath the flange 57 of the supporting means 55. This member 58 acts as a support for the member 55 at its central zone and gives rigidity to the entire structure.

The container 2 is best shaped to conform to the configuration of the base receiving portion of the casing 5. In the drawings, a plan of the base of the container shows it to be oval in outline, although said shape is purely arbitrary. This container is provided with sloping side walls and a depressed spout. The base 59 of the container is formed with an opening 60, and the outer surface of said base 59 is relieved or counter-bored adjacent said opening 60, as indicated at 61.

A shaft 62 has screw-threaded or otherwise held at one end thereof a jaw clutch element 63; the opposite end of said shaft is provided with an enlarged flange 64, a squared portion 65, and a threaded extension 66. Surrounding the shaft is a bearing block 67, provided with a shoulder 68 to accommodate the flange 64. The jaw clutch element is separated from the base of said bearing block by a washer 69. In this manner, the shaft is held within the bearing block. The bearing block is provided with an annular groove 70 adapted to hold an oil wick 71. Oil ports extend radially inwardly of said bearing block and said wick receiving groove so that oil may be disposed between the shaft and the bearing block. Surrounding the bearing block is a sleeve 72, which is provided with an inwardly directed flange 73 terminating adjacent the periphery of the flange 64 of the shaft, with a further portion of said sleeve provided with an outwardly directed annular flange 74 and a downwardly directed flange 75. The flange portions 74 and 75 function as a cap adapted to overlie in part the Z-shaped member 58 carried by the annulus 37. Interposed between the base 59 and flange 74 is a washer 76. Surrounding the sleeve 72 and secured thereto is a ring 77 and interposed between said ring and the inner surface of the base of the container is a washer 78.

Carried on the squared portion 65 of the shaft is a cutter 79, and interposed between said cutter and the flange 64 and in part surrounding sleeve 72 is sleeve 80. Cap nut 81 secured to threads 82 is adapted to hold the cutter and sleeve 80 in position of assemblage on the shaft 62.

The cutter 79 may assume various forms, certain of which are illustrated in Figures 4 to 10, inclusive. The cutter shown in Figures 4 and 5, being the same type as depicted in Figure 3, comprises a series of spaced apart blades. Certain of the blades are of greater length than others thereof. In Figure 5, the diametrically disposed blades 100 and 101 are of the greatest length; blades 102 and 103 next in size, with gradual decrease in the length of pairs of the remaining blades shown at 104, 105, 106 and 107. All of the blades have a curved leading or cutting edge 108. The trailing edge may be slightly curved, with ends of the blade substantially pointed, as shown at 109. Considering the leading edge as curved, it may be stated that the said blades have a sweep-back. The blades 100, 101, 102 and 103 are bent downwardly with respect to a horizontal plane passing through the hub portion 110 of the cutter. For convenience, this downward curvature of said blades will be termed a cathedral. The blades 104 and 105 are planar, that is to say, in the same plane as the plane of the hub, while blades at 106 and 107 are at a dihedral or bent upwardly (see Figure 4). We thus have cutter blades in the plane of the hub of the cutter; other blades curvedly extending below the horizontal plane of said hub; and blades extending above the horizontal plane of said hub. These blades are given a sharp edge by beveling, as indicated in Figure 6.

We have found it expedient to flute the cutting edge of the blades, as illustrated in Figures 7 and 9, at 111. In Figure 8, the cutting edge is in the form of a saw tooth 112, and the blade is transversely fluted, as shown at 113.

The operation, uses and advantages are as follows:

The cutter is within the confines of the container 2, and said cutter may be readily removed from the squared end of the shaft by removing the cap nut 81, whereupon the container may be properly sterilized or cleaned, the cutters changed, etc. The construction is such that the propeller shaft is out of contact with any of the pulp or juices within the container. It will be observed that the sleeve 72 passes through the central opening of the base of the container and that said sleeve is in a fluid-tight seal with both sides of said container base. Thus, liquids are prevented from escaping as between the sleeve and the central opening in the container. The cap-type sleeve 80 surrounds in part the sleeve 72. This cap-type sleeve is adapted to rotate with the shaft 62. It may be easily shown that a fluid is unable to enter between the two sleeves 72 and 80, and even if it did, the washer included between the flange 64 of the shaft 62 and the portion 73 of sleeve 72 would prevent any liquid from being received between the shaft 62 and its bearing block 67. Hence, liquid is prevented from escaping from the container at the shaft portion.

The shaft 62 carries the jaw clutch element 63 which engages the cross piece 48 on the upper end of the stud shaft 47. As shown in Figure 3, this jaw clutch element is of the usual construction, having an abrupt wall and an inclined wall leading to a further diametrically disposed abrupt wall. Thus, this clutch element is self-positioning on the cross piece.

When the plug 114 is placed in a suitable outlet, leading to a source of electrical current, a switch element 115 and 116 may be depressed for the purpose of conducting electricity to the motor. The motor has two speeds in the present instance, although it is obvious that the speed control may be variable, as desired. No details of the switch box are given. There is also shown an "off" switch 117. These switches may be located in the front portion of the casing 4, and so shaped as to best conform to the general configuration of the casing and lend to its ornamental appearance.

The bottom of the casing 4 may be closed by a plate 118, and rubber feet 119 may be provided.

In actual practice, the motor is of the high speed type, adapted to turn its shaft approximately 22,000 revolutions per minute at one of the speeds. When it is desired to extract the juice from say, a carrot, the carrot is first cleaned and then dropped within the container. The cutter is revolved at a high rate of speed and it has been found that the vegetable is ground so finely that all of the juice is extracted therefrom. Any pulp will either sink to the bottom of the juice or rise to the top, depending upon the particular vegetable or fruit, with the result that straining of the juice may or may not be necessary. In the case of a banana, it has been found that after the same contacts the cutter that the resultant liquid has the consistency of cream.

The device performs its operation in a very rapid manner.

Cleaning of the device is easy of accomplishment, as has been heretofore explained.

We claim:

1. In cutter construction for juice extractors having a container, a cutter positioned within the container, and a motor for driving said cutter; said cutter comprising radial blades arranged in four diametric pairs, each blade having a sharp sweep-back cutting edge, all blades being tapered in form to a point at the tip thereof, and each diametric pair of blades differing in length from the other pairs of blades.

2. In cutter construction for juice extractors having a container, a cutter positioned within the container and adapted to be driven by a motor; said cutter comprising radial blades arranged in four diametric pairs, the faces of which are serrated, each blade having a sharp sweep-back cutting edge, all blades being tapered in form to a point at the tip thereof, and each diametric pair of blades differing in length from the other pairs of blades.

3. In cutter construction for juice extractors having a container, a cutter positioned within the container and the cutter adapted to be driven by a motor; said cutter comprising radial blades arranged in four diametric pairs, each blade having a sharp sweep-back fluted cutting edge, all blades being tapered in form to a point at the tip thereof, and each diametric pair of blades differing in length from the other pairs of blades.

4. In cutter construction for juice extractors having a container, a cutter positioned within the container and adapted to be driven by a motor; said cutter comprising radial blades arranged in four diametric pairs, each blade having a sharp sweep-back cutting edge, all blades being tapered in form to a point at the tip thereof, certain of said diametric blades being at a cathedral, others horizontal and still others at a dihedral to a plane at right angles to the axis of said cutter, and each diametric pair of blades differing in length from the other pairs of blades.

JACKSON D. COMSTOCK.
DON E. GROVE.